(12) United States Patent
Ferrara

(10) Patent No.: US 8,701,361 B2
(45) Date of Patent: Apr. 22, 2014

(54) ROOFTOP SYSTEM WITH INTEGRATED PHOTOVOLTAIC MODULES AND METHOD FOR CONSTRUCTING THE SAME

(76) Inventor: Pierino Ferrara, Tossicia (IT)

(*) Notice: Subject to any disclaimer, the term of this patent is extended or adjusted under 35 U.S.C. 154(b) by 0 days.

(21) Appl. No.: 13/302,041

(22) Filed: Nov. 22, 2011

(65) Prior Publication Data

US 2012/0174504 A1 Jul. 12, 2012

Related U.S. Application Data

(60) Provisional application No. 61/431,901, filed on Jan. 12, 2011.

(51) Int. Cl.
*E04D 13/18* (2006.01)

(52) U.S. Cl.
USPC ........ 52/173.3; 126/621; 136/251; 52/745.06

(58) Field of Classification Search
USPC .............. 52/173.3, 745.06; 136/230, 251; 126/621, 622, 623
See application file for complete search history.

(56) References Cited

U.S. PATENT DOCUMENTS

| | | | | |
|---|---|---|---|---|
| 4,278,072 A * | 7/1981 | Ryan et al. | .................... | 126/632 |
| 4,333,444 A * | 6/1982 | Sell et al. | ...................... | 126/623 |
| 4,372,292 A * | 2/1983 | Ort | ................................. | 126/622 |
| 5,036,833 A * | 8/1991 | Quigley et al. | ............... | 126/621 |
| 5,657,745 A * | 8/1997 | Damminger | .................... | 126/633 |
| 5,706,617 A * | 1/1998 | Hirai et al. | .................... | 52/173.3 |
| 5,986,203 A * | 11/1999 | Hanoka et al. | ................ | 136/251 |
| 7,694,466 B2 * | 4/2010 | Miyamoto et al. | ............ | 52/173.3 |
| 7,856,769 B2 * | 12/2010 | Plaisted et al. | ................ | 52/173.3 |
| 8,181,402 B2 * | 5/2012 | Tsuzuki et al. | ................ | 52/173.3 |
| 2003/0201009 A1* | 10/2003 | Nakajima et al. | ............. | 136/251 |
| 2007/0227531 A1* | 10/2007 | Garcia Cors et al. | ......... | 126/622 |
| 2008/0302407 A1* | 12/2008 | Kobayashi | .................... | 136/251 |
| 2009/0025314 A1* | 1/2009 | Komamine et al. | .......... | 52/173.3 |
| 2010/0175338 A1* | 7/2010 | Garcia Cors | ................. | 52/173.3 |
| 2010/0212657 A1* | 8/2010 | Moller | .......................... | 126/623 |
| 2011/0302857 A1* | 12/2011 | McClellan et al. | .......... | 52/173.3 |

FOREIGN PATENT DOCUMENTS

WO 2006076719 A2 7/2006
WO 2007137199 A3 11/2007

* cited by examiner

*Primary Examiner* — Adriana Figueroa
(74) *Attorney, Agent, or Firm* — Loginov & Sicard; William A. Loginov

(57) ABSTRACT

This invention provides a novel design of a rooftop with structurally and functionally integrated photovoltaic modules that includes photovoltaic modules, which can be commercially available and which are augmented with additional framing including additional structural and functional layers. The modules are mounted on a grid like supporting structure sitting on vertical elevation structures, such as building walls or columns. The design enables cost reduction, fast installation and improved performance of rooftops with photovoltaic power.

18 Claims, 10 Drawing Sheets

ROOFTOP SYSTEM WITH INTEGRATED PHOTOVOLTAIC MODULES AND METHOD FOR CONSTRUCTING THE SAME

RELATED APPLICATION

This application claims the benefit of U.S. Provisional Application Ser. No. 61/431,901, filed Jan. 12, 2011, entitled ROOFTOP SYSTEM WITH INTEGRATED PHOTOVOLTAIC MODULES AND METHOD FOR CONSTRUCTING THE SAME, the entire disclosure of which is herein incorporated by reference.

FIELD OF THE INVENTION

This invention relates to rooftop construction techniques in which photovoltaic modules are used as integral components of the roofing structure.

BACKGROUND OF THE INVENTION

As mankind continues to develop around the world, the demand for energy rises. Most energy used to power machines and generate electricity is derived from fossil fuels, such as coal, natural gas or oil. These supplies are limited and their combustion causes atmospheric pollution and the production of Carbon Dioxide, which is suspected to accelerate the greenhouse effect and lead to global climate change. Some alternative approaches to produce energy include the harnessing of nuclear energy, wind, moving water (hydropower), geothermal energy or solar energy. Each of these alternative approaches has drawbacks. Nuclear power requires large capital investments and safety and waste disposal are concerns. Wind power is effective, but wind turbines require a windy site, often far away from grid connections and take up large footprints of land. Hydropower requires the construction of large, potentially environmentally harmful dams and the displacement of large volumes of flowing water. Geothermal power requires a source of energy that is relatively near the surface—a characteristic not common to a large portion of the Earth—and has the potential to disrupt the balance of forces that exist inside the Earth's crust. Solar is one of the cleanest and most available forms of renewable energy and it can be harnessed by direct conversion into electricity (solar photovoltaic) or by heating a working fluid (solar thermal).

Solar photovoltaic (PV) technology relies on the direct conversion of solar power into electricity through the photoelectric effect: solar radiation's quantized particles, or photons, impinging on semiconductor junctions may excite pairs of conduction electrons and valence holes. These charged particles travel through the junction and may be collected at electrically conductive electrodes to form an electric current in an external circuit.

Photovoltaic is one of the most promising technologies for producing electricity from renewable resources, for a number of reasons: 1. The photovoltaic effect in Si and other solid-state semiconductors is well understood and the technology fully validated; 2. PV power plants convert directly solar power into electrical power, have no moving parts and require low maintenance; 3. Solar radiation is quite predictable and is maximum during hours of peak electricity consumptions; and 4. The industry has been aggressively pursuing a performance improvement and cost reduction path similar to the Moore's law in semiconductor electronics, approaching the condition of market competitiveness with traditional energy resources in many parts of the world. In 2010, approximately 16 GW of solar photovoltaic were installed globally, over a 100% growth from global installations in 2009.

However, PV is still more expensive than traditional energy resources in most parts of the world: while economy of scale and low cost manufacturing will contribute to further reduce cost, technological innovation is needed to achieve market competitiveness more rapidly and on an economically sound and sustainable basis.

Applications exist where the value-added features of photovoltaic module technology would offset their cost premium and the market would readily accept it. For example, in the case of new rooftops, it is desirable to incorporate photovoltaic modules as roofing elements in a manner that would displace the cost of rooftop construction materials and reduce the installation time.

SUMMARY OF THE INVENTION

This invention overcomes disadvantages of the prior art by providing a rooftop construction system and method in which photovoltaic modules are used as integral components of the roofing structure, and provide electricity generation as well as structural, acoustic, and thermal insulation capabilities to reduce the overall cost and increase the speed of installation of rooftops with photovoltaic power. In an illustrative embodiment, a system, comprising a Rooftop with Structurally and Functionally Integrated Photovoltaic Modules (RS-FIPM) overcomes the following deficiencies of previous methods of installing photovoltaic modules on new construction rooftops: the high cost of installation of a PV array onto a rooftop; the duplication of materials and labor; the perforation of the building envelope by fixating means such as bolts or nails; The extra load on the structure caused by non-integrated PV arrays. By implementing a grid-like support structure and by tessellating it with photovoltaic modules augmented with extra structural and functional layers, many benefits, including faster installation time, lower material and labor cost, total architectural integration of photovoltaic power generation, lightweight roofing structure, etc. can be realized.

Illustratively, a system and a method for constructing rooftops with structurally and functionally integrated photovoltaic modules includes the steps of creating a grid-like structure of interconnected beams and mounting rails sitting on vertical elevation structures, such as walls or columns. Photovoltaic modules, which can be adapted from commercially available units, and are augmented with at least one additional structural and functional layer are then mounted in the grid-like structure. The grid-like structure illustratively includes members arranged in parallel that are constructed and arranged to slidably receive, capture and retain the photovoltaic modules between respective pairs of the members. These members can include a cross section shape formed with a plurality of shoulders and slots sized to receive, capture and retain an edge of the module and edges of other structures, such as insulating and supporting layers. The members can be formed as extrusions that are symmetrically slotted on both sides (e.g. along the inner area of the roof surface) or asymmetrical (e.g. where used at the end of the roof).

In a further illustrative embodiment, an integrated photovoltaic roofing system includes a photovoltaic module, a lateral frame, a frontal frame and a plurality of layers with structural and functional properties that can include structural support, acoustic insulation, thermal insulation and other advantageous roofing properties.

In yet another illustrative embodiment, an integrated photovoltaic roofing system includes a photovoltaic module with customized frame and a second mated frame, which is fixated onto a pair of mounting members including a plurality of shoulders and slots sized to receive, capture and retain an edge of the mated frame and edges of other structures, such as insulating and supporting layers.

An illustrative, dedicated mounting arrangement for roofing is also provided, comprising a mounting rail a corresponding (matching) retaining fixture. This mounting arrangement can be employed to receive photovoltaic modules in accordance with illustrative embodiments herein.

BRIEF DESCRIPTION OF THE DRAWINGS

The invention description below refers to the accompanying drawings, of which.

DETAILED DESCRIPTION

A Rooftop with Structurally and Functionally Integrated Photovoltaic Modules (RSFIPM), according to the illustrative embodiments described below, is a rooftop construction method where photovoltaic panels are adapted for use as integral components of the roofing structure and provide electricity generation as well as structural and acoustic and thermal insulation capabilities, to overall reduce the cost of rooftops with photovoltaic power.

The dominant technique for the realization of rooftops of commercial and industrial facilities today consists of the interconnection of large segments of a multi-layer structure comprising a top layer of galvanized steel, aluminum or copper; a mid layer of polyurethane foam, mineral wool or other insulating and fireproof material; a bottom layer of galvanized steel, aluminum, or plastic materials (PVC, fiberglass, etc.).

In its generalized implementation, the RSFIPM replaces the multi-layer structure with a grid-like supporting structure and by tessellating it with photovoltaic modules augmented with extra structural and functional layers. The modules' frames are also modified so that when they are placed by one another and anchored to the mounting rails, a continuous, waterproof structure results.

Figure 1:
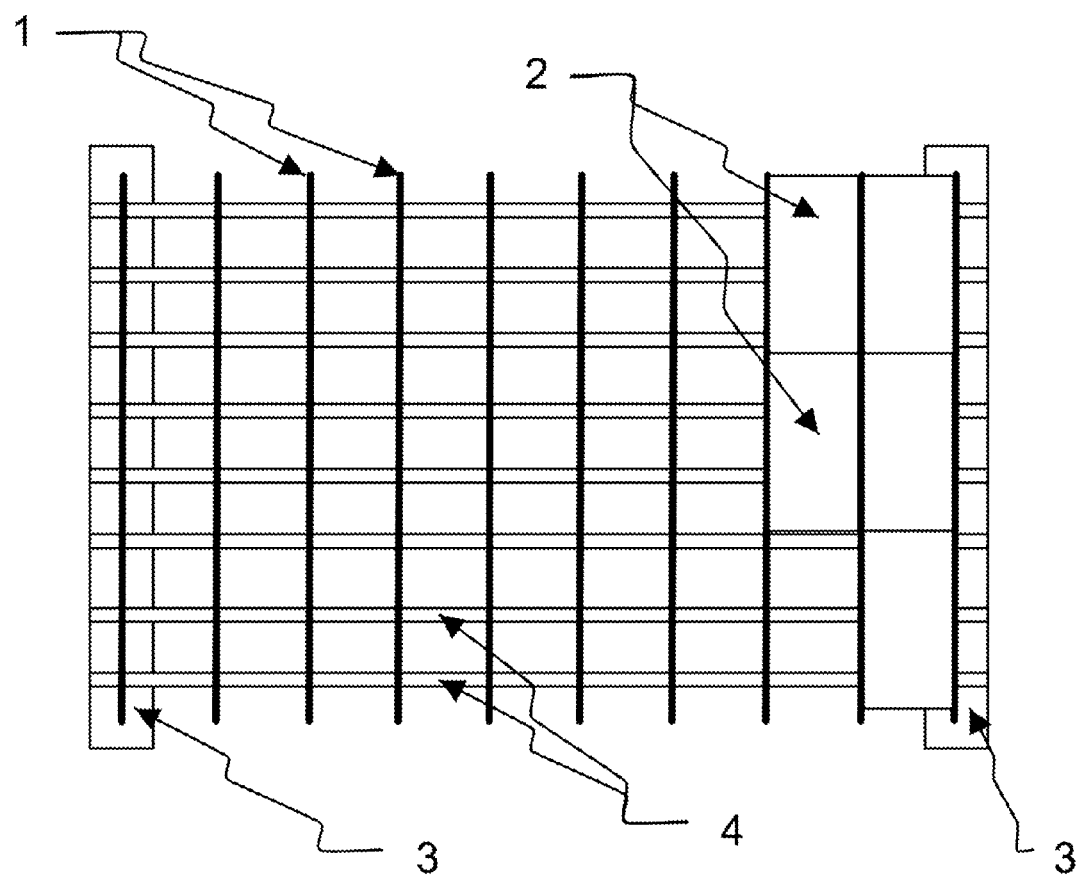
FIG. 1 is a top view of a rooftop with structurally and functionally integrated photovoltaic modules according to an illustrative embodiment.

A top view of RSFIPM is shown in FIG. 1: Integrated Photovoltaic Modules (IPM) 2 are mounted on mounting rails 1. Mounting rails 1 are anchored onto beams 4, which sit on top of lateral elevation elements 3, such as walls, columns or similar. The modules can be adapted from any commercially available photovoltaic panel using any accepted physical principal for generating electricity from sunlight. Mounting rails 1 and beams 4 are illustratively constructed from aluminum, steel, reinforced concrete, wood, plastic, composites or other materials typically used in the roofing and construction industry, as it will be evident to those skilled in the art (or combinations of such materials). Mounting rails 1 are illustratively aligned with the direction of steeper slope of the portion of roof under consideration, in order to prevent leakage of running waters through the roof structure. Other alignments and orientations are expressly contemplated. The supporting structure, comprising beams 4 and mounting rails 1, is dimensioned according to regional building codes to be able to withstand the minimal loads imposed by regulators, as will be apparent to those skilled in the art.

Figures 2A, 2B:
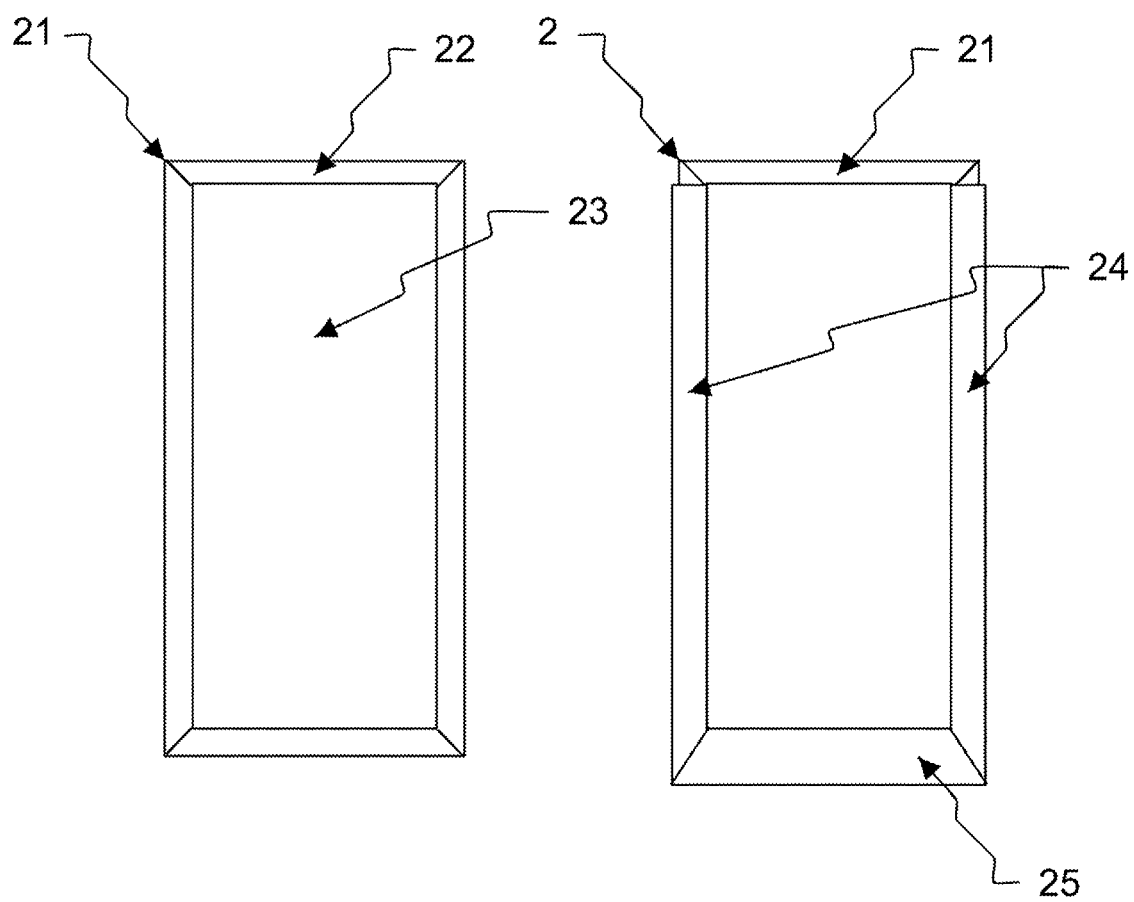
FIGS. 2A-2B are top views of a photovoltaic module and an augmented photovoltaic module, which becomes an integral component of the rooftop, according to an embodiment.

FIG. 2A shows a photovoltaic module 21, which is formed by PV laminate 23 and frame 22. PV laminate 23 is a multi-layer structure comprising a top transparent layer (such as glass), a layer of interconnected PV cells and a back protective layer, all joined together by multiple layers of encapsulating material such as ethylene-vinyl acetate (EVA). FIG. 2B shows IPM 2, which results from augmenting photovoltaic module 21 with lateral framing 24 on either two parallel sides (long sides in the illustrative drawing, or short sides in yet another embodiment) and with frontal framing 25 on one of the remaining two sides of 21. Framing 24 and 25 allow IPM's to fit relatively precisely with the mounting rails and with one another in a continuous, waterproof structure. In particular, lateral framing 24 slides into mounting rails 1, while frontal framing 25 points in the direction of steeper slope of the roof and overlaps with the recessed section of frame 22 of nearby IPM.

Figure 3:
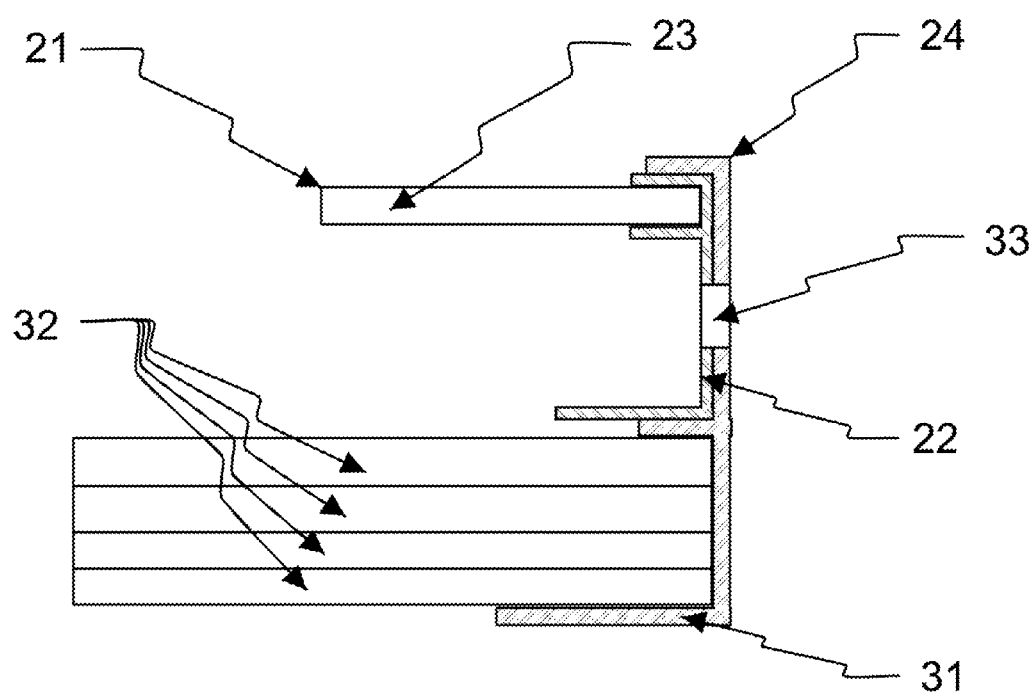
FIG. 3 is a cross section of one side of an integrated photovoltaic module, according to an embodiment.

FIG. 3 illustratively shows the cross section of lateral framing 24. In one embodiment, lateral framing 24 is built by fixing external extrusion 31 to frame 22 mechanically (such as welding, crimping, mechanical interference, etc.) and/or chemically (such as gluing, etc.) in such a way that external extrusion 31 and frame 22 form a waterproof structure. External extrusion 31 can be provided with one or more vertically stacked, L-shaped brackets for the inclusion of one or more structural or functional layers 32. Each layer 32 can serve one or more functions, including aesthetic decoration; structural support, in order to comply with load requirements of rooftop paving; acoustic insulation; thermal insulation; fireproofing; or other special requirements. Each layer 32 can be formed of several possible materials, including galvanized steel, aluminum, copper, plastic, mineral wool, polyurethane foam, or any other suitable material. Each layer 32 generally can include an area substantially similar to PV laminate 23, e.g. it extends from side to side across the module. Lateral framing 24 can contain lateral opening 33 underneath PV laminate 23 but above structural and functional layers 32 to allow air circulation for cooling of PV laminate 23. In yet another embodiment, lateral framing 24 can be a single extrusion which directly replaces standard module frame 22.

Figure 4:
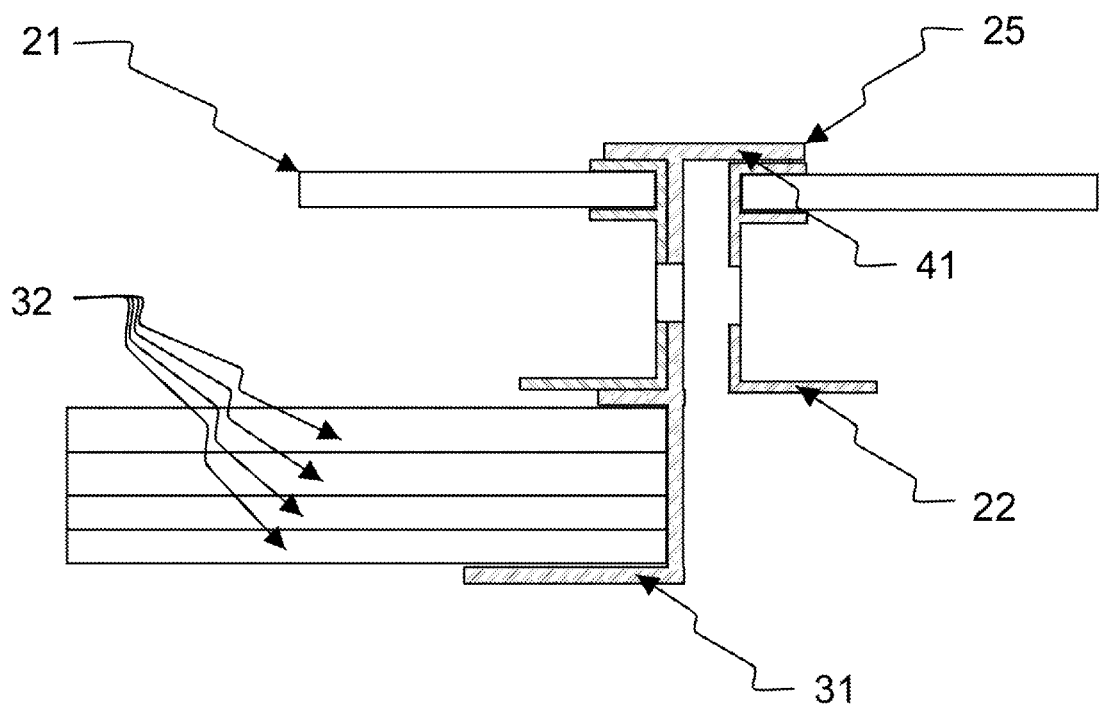
FIG. 4 is a cross section of one side of an integrated photovoltaic module, according to an embodiment.

FIG. 4 illustratively shows the cross section of frontal framing 25. This can be substantially identical to the cross section of lateral framing 24, except for extension 41, which overlaps with the recessed section of frame 22 of nearby IPM. This folded structure is thereby illustratively oriented so that extension 41 points in the direction of steeper slope of the roof and ensures waterproofing from the outdoor environment. This arrangement functions similarly to roofing shingles. Additional waterproofing can be achieved by adding a layer of sealing glue, such as Silicone glue for outdoor use, between frames 41 and 22.

Figure 5:
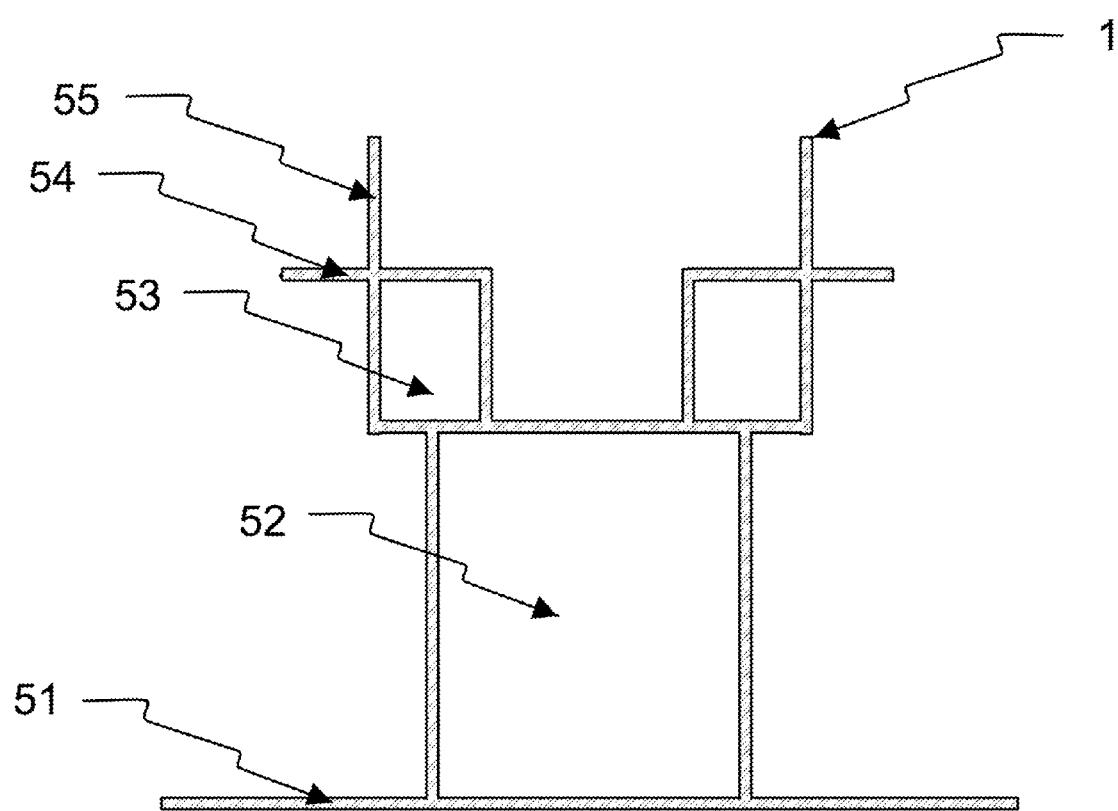
FIG. 5 is a cross section of a mounting rail for fixating integrated photovoltaic modules to the rooftop grid structure, according to an embodiment.
Figure 6:
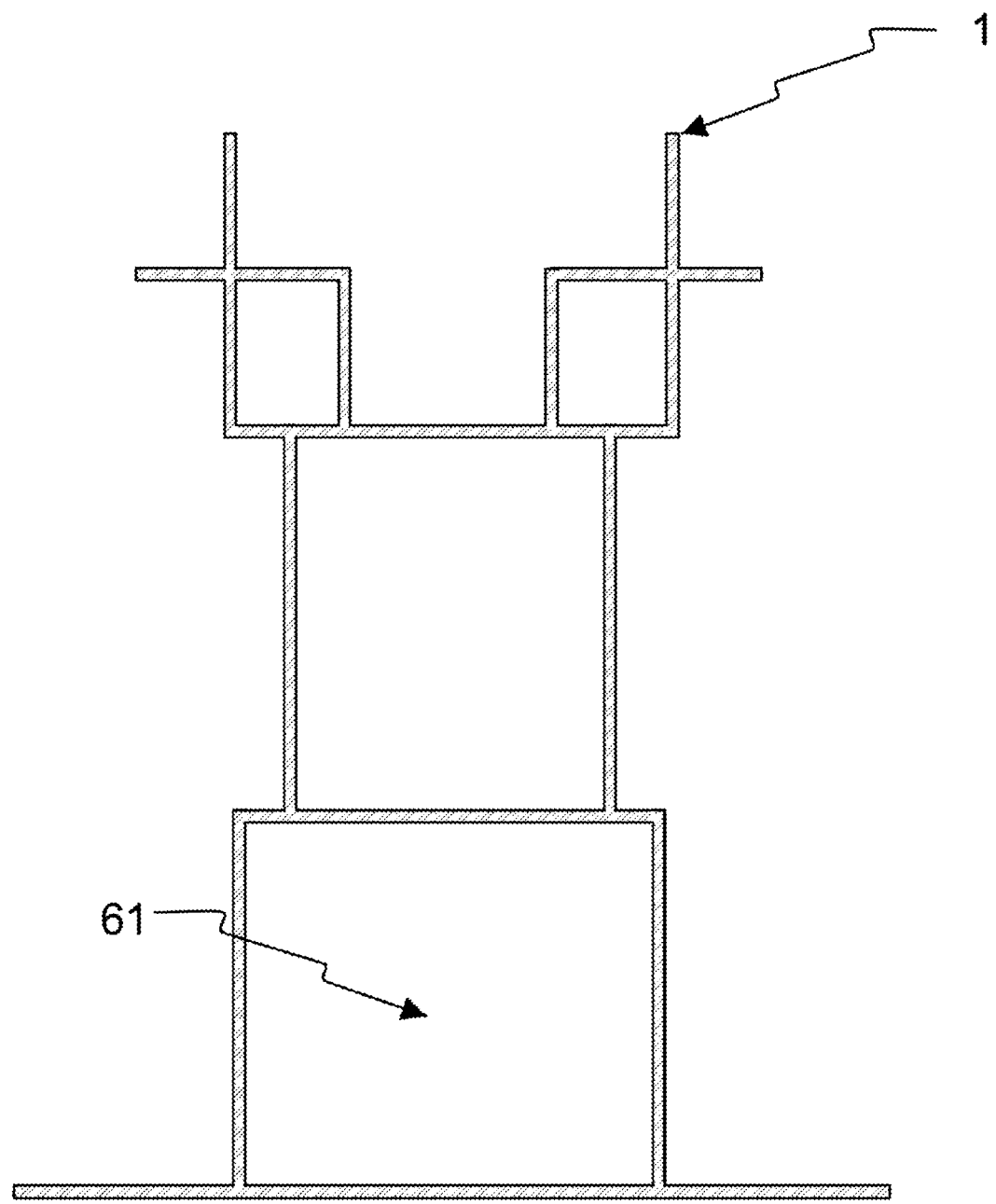
FIG. 6 is a cross section of a mounting rail for fixating integrated photovoltaic modules to the rooftop grid structure, according to an embodiment.

FIG. 5 illustratively shows the cross section of mounting rail 1. According to one embodiment, mounting rail 1 comprises a substantially symmetric structure including base 51, rectangular cross-section channels 52, smaller rectangular cross-section channels 53, horizontal extensions 54 and vertical extensions 55. This allows for a generic rail structure and versatile placement of the rails along the roof during an installation. In an embodiment, the termination rails at each extreme end of the roof are illustratively asymmetrical to provide a clean line at the edge of the structure. According to one manufacturing method, mounting rail 1 can be formed by extrusion of a suitable material, such as aluminum. Alternatively, another metallic or non metallic material (e.g. polymer, composite, etc.) can be used to form this or other components herein as appropriate. According to another embodiment, which is illustrated in FIG. 6, one or more additional stages 61 can be stacked vertically to form a multi-stage cross section.

Figure 7:
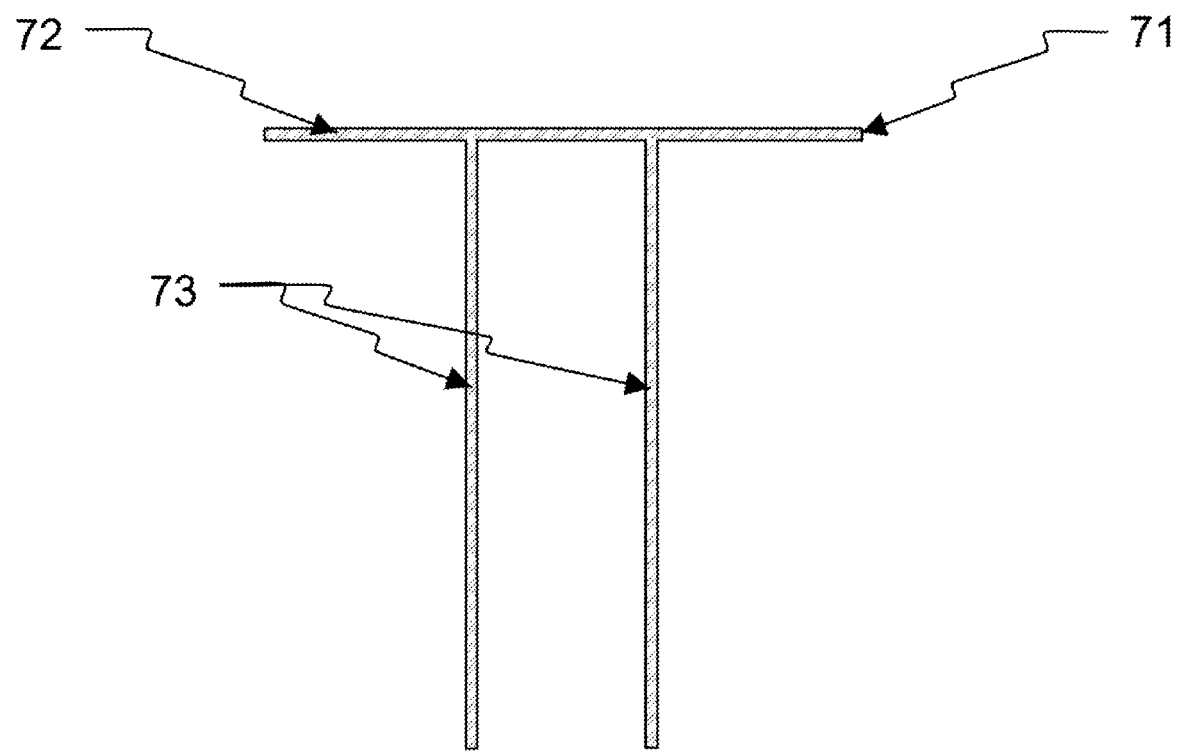
FIG. 7 is a cross section of a retaining fixture to anchor integrated photovoltaic modules to a mounting rail, according to an embodiment.

FIG. 7 illustratively shows the cross section of retaining fixture 71. According to one embodiment, retaining fixture 71 is a double-T structure comprising top plane 72 and lateral planes 73. According to one manufacturing method, retaining fixture 71 can be formed by extrusion of a suitable material, such as aluminum.

Figure 8:
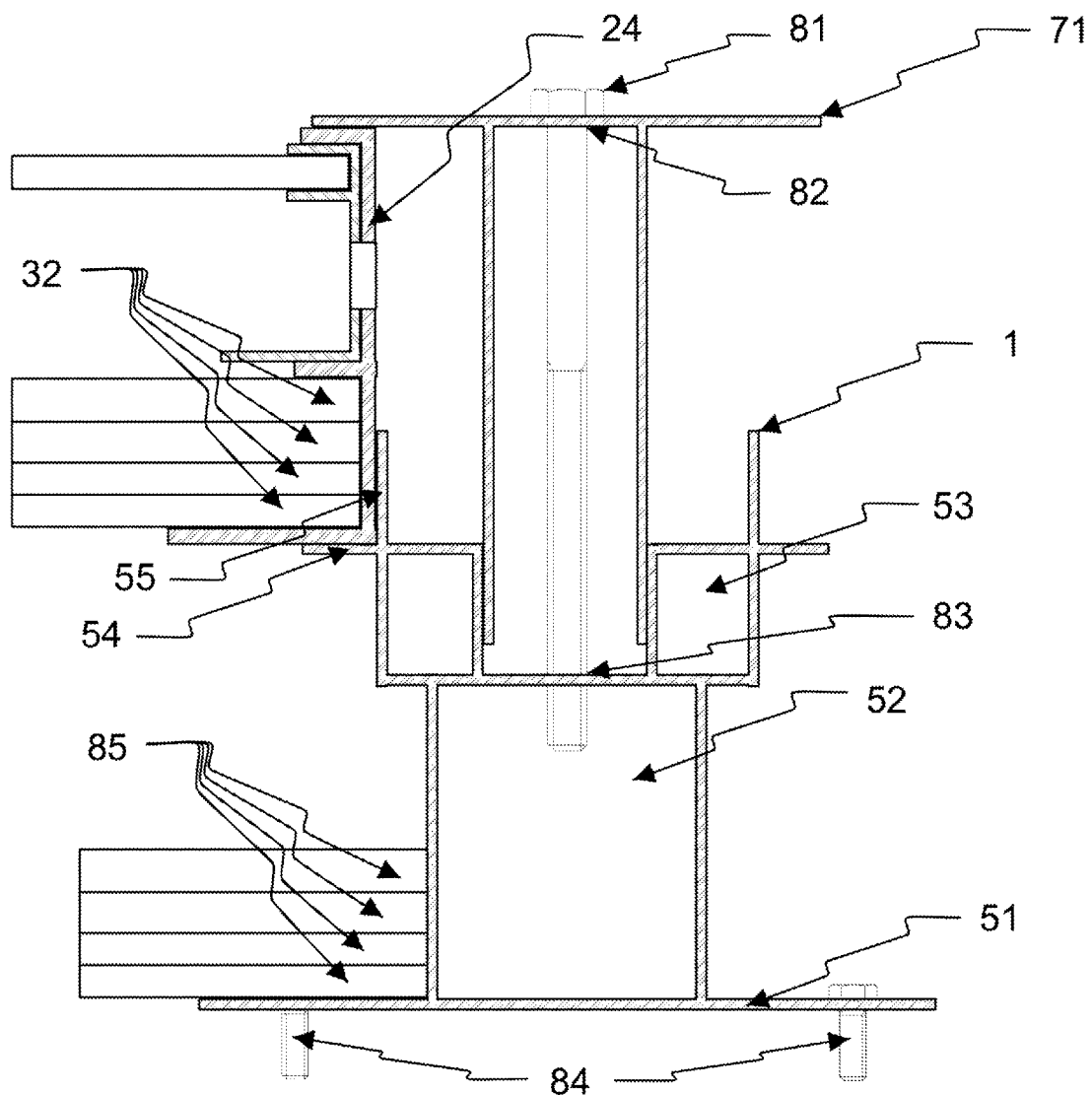
FIG. 8 is a cross section of a complete rooftop mounting assembly, including an integrated photovoltaic module, a mounting rail and a retaining mechanism, according to an embodiment.

FIG. 8 illustratively shows the mounting arrangement of Integrated Photovoltaic Module 2, mounting rail 1 and retaining fixture 71. For added clarity, the mounting arrangement is shown only on one side of the figure (i.e. the left side as viewed), while on the other side (i.e. the right side), another IPM or a proper termination can be mounted. According to one embodiment, bolt or screw 81 is passed through passing hole 82 in retaining fixture 71. Bolt or screw 81 screws into self-threaded hole 83. In another embodiment, bolt or screw 81 can comprise any suitable mechanism and/or technique for assembling framing 24, retaining fixture 71, and mounting rail 1. Lateral planes 73 of retaining fixture 71 slide between channels 53 of mounting rail 1. Lateral framing 24 sits on lateral extension 54, while its lateral alignment is guided by vertical extension 55. By tightening bolt or screw 81, lateral framing 24 is compressed between retaining fixture 71 and mounting rail 1 in a waterproof grip. It should be noted that even in the presence of leaks between retaining fixture 71 and lateral framing 24, water would be collected in channel 52 and drained away. Base 51 of mounting rail 1 is secured to beams 4 of RSFIPM by bolts or screws 84. Additional structural or functional roofing layers 85 can be included sitting directly on base 51.

Figure 9:
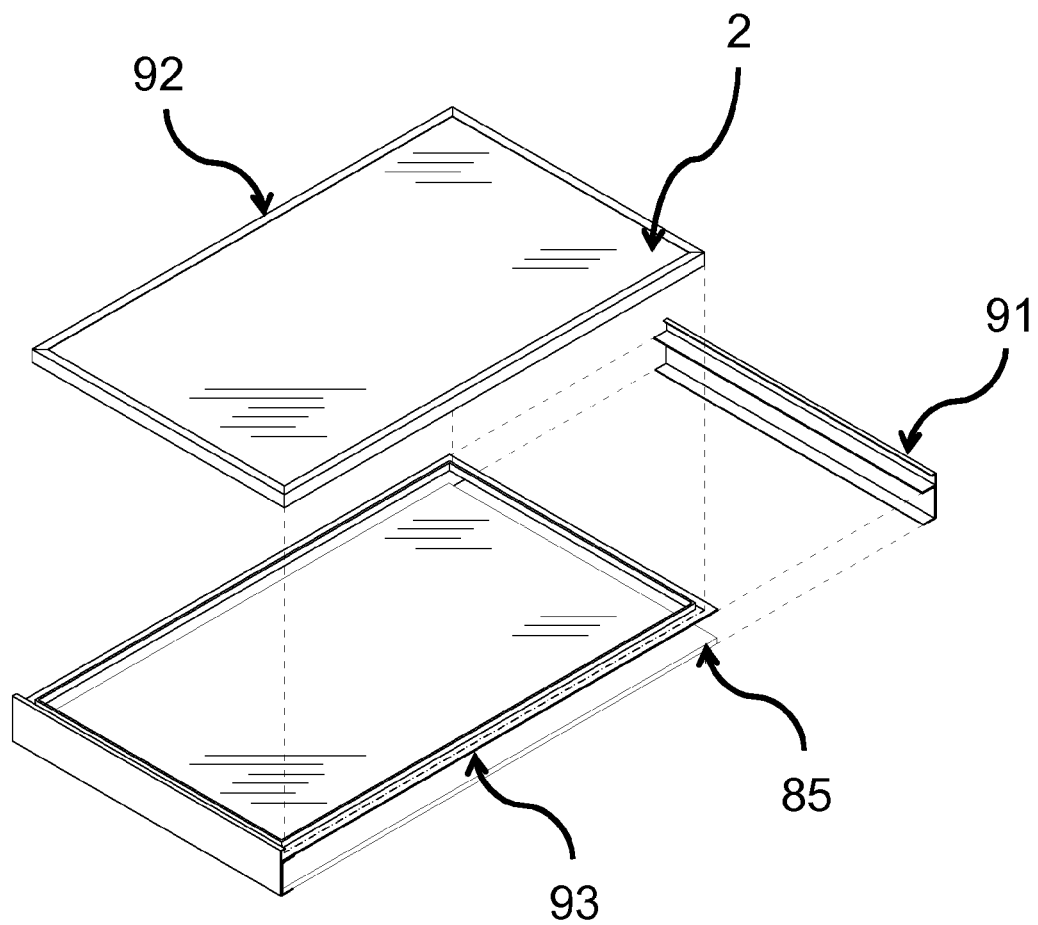
FIG. 9 is an explosion of another illustrative embodiment of an exemplary rooftop with structurally and functionally integrated photovoltaic modules, where the customized frame of the PV module fits into a mated frame.

FIG. 9 illustratively shows the exploded view of another embodiment of RSFIPM. Members 91 include a plurality of shoulders and slots sized to receive, capture and retain an edge of the mated frame and edges of other structures, such as insulating and supporting layers 85. Photovoltaic module 2 includes a customized frame 92, which fits into mated frame 93, in such a way that 92 lays always outside the perimeter of 93. Photovoltaic module 2 is fixated onto mated frame 93 by mounting brackets or other suitable means, as it will be apparent to those skilled in the art. Such brackets can include hinges, which can be of conventional design and implementation, in order to allow photovoltaic module 2 to be opened for installation and maintenance of RSFIPM, Mated frame 93 is fixated onto one of the slots of members 91.

Figure 10:
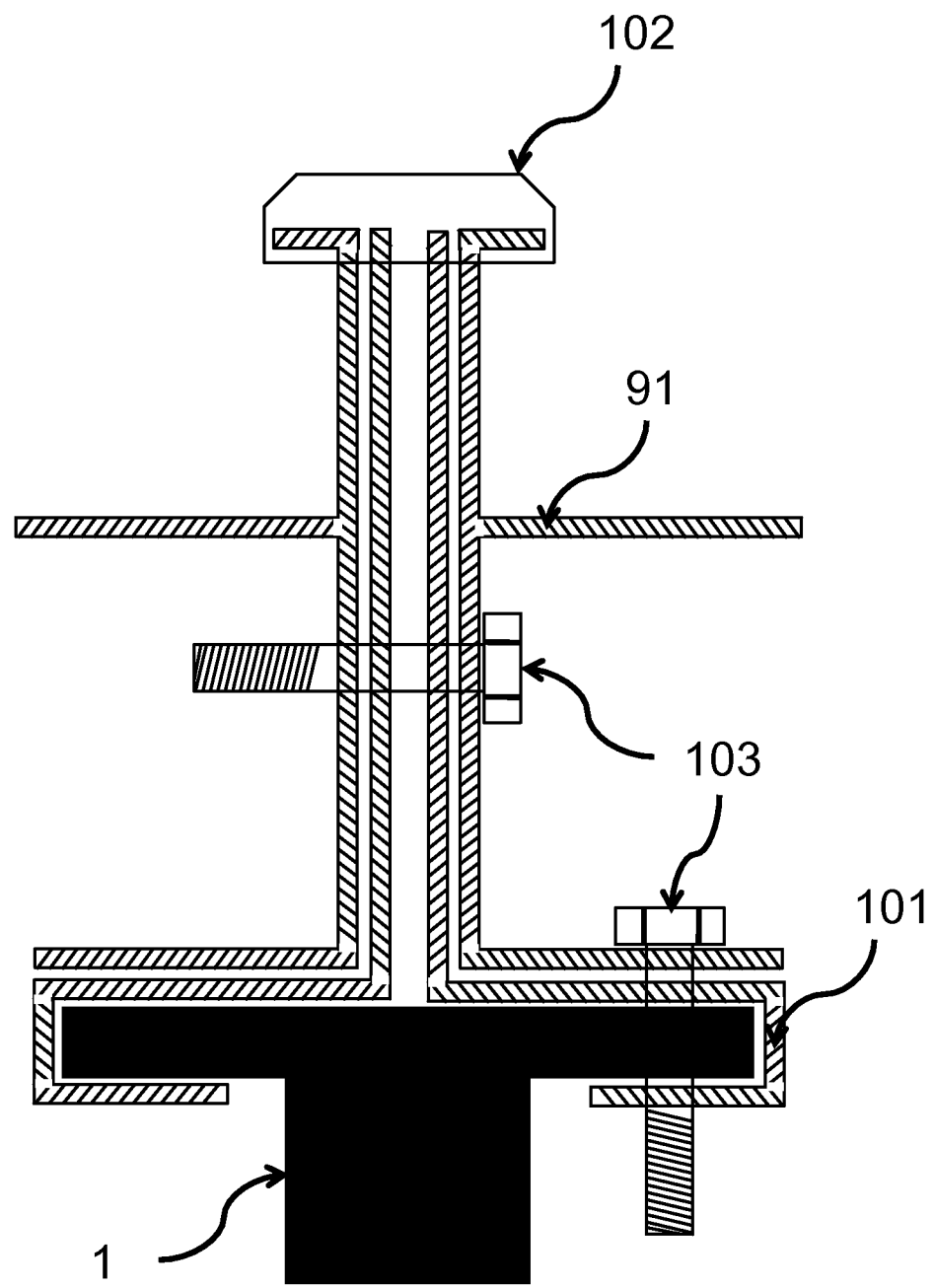
FIG. 10 is a cross section of an illustrative mounting assembly that enables fixation of structurally and functionally integrated photovoltaic modules to the mounting rails to an exemplary rooftop.

FIG. 10 illustratively shows one mounting arrangement for the embodiment of RSFIPM described in FIG. 9. Mounting rails 1 have a T-shaped cross section. Members 101 clamp around mounting rails 1 and offer a shoulder were members 91 sit. Tops 102 are used to clamp together members 101 and members 91 into a mechanically stable unit. Bolts 103 or other suitable fastening/attachment mechanisms, known to those skilled in the art, are used to further secure the construction to underlying support beams or members.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the sizes, shapes and form factors of components described herein can be varied to suit a particular application. Likewise, additional layers, enclosures, housings and mounting assemblies can be employed in conjunction with RSFIPM and IPM as appropriate. Accordingly, this description is meant to be taken only by way of example, and not to otherwise limit the scope of this invention.

What is claimed is:

1. A method for constructing rooftops with structurally and functionally integrated photovoltaic modules comprising the steps of:

providing one or more photovoltaic PV modules, wherein each of the photovoltaic modules is formed by a PV module and a mated frame;

providing a grid-like structure of interconnected beams and mounting rails sitting on vertical elevation structures and defining a grid of roof members, wherein the mounting rails are adapted as roofing members each having a base configured to support a plurality of stacked layers, the stacked layers comprising one or more structural or functional layers extending into an interior building environment, a first channel on a first upper side of each of the mounting rails and a second channel on an opposing second upper side of each of the mounting rails, wherein each of the first channel and the second channel have respective vertical and horizontal extensions above the layers;

providing a plurality of vertically stacked bracket assemblies, wherein each of the bracket assemblies is received by the first channel and the second channel of each of the mounting rails, respectively, and wherein each of the bracket assemblies respectively engages one of the photovoltaic modules at an external surface exposed to an outside environment and secures a plurality of stacked layers on at least one of the bracket assemblies below the photovoltaic module, and wherein the photovoltaic modules are separated from the layers by a gap that is sized and arranged to provide passive or active cooling; and mounting in each of the mounting rails each of the plurality of bracket assemblies, respectively, to define a roof surface, the step of mounting including securing the bracket assemblies into each of the mounting rails with an overlying retaining fixture having a fastener extending downwardly into a respective one of the mounting rails.

2. The method as set forth in claim 1 wherein the stacked layers include insulating and supporting layers.

3. The method as set forth in claim 1 wherein the retaining fixture and a respective one of the mounting rails are secured together by a bolt.

4. The method as set forth in claim 1 wherein the photovoltaic modules are adapted from commercially available photovoltaic panels.

5. The method as set forth in claim 1 wherein the vertical elevation structure is supported by at least one of a wall and a column.

6. The method as set forth in claim 1 wherein the structural and functional layers include insulating and supporting layers.

7. The method as set forth in claim 6 further comprising, arranging the roof members in parallel to slidably receive, capture and retain each of the photovoltaic modules between respective pairs of the members.

8. The method as set forth in claim 1 further comprising, arranging the roof members in parallel to slidably receive, capture and retain the mated frames between respective pairs of the members.

9. The method as set forth in claim 1 wherein the brackets include hinges.

10. A roof system with structurally and functionally integrated photovoltaic (PV) modules, wherein each of the photovoltaic modules is formed by a PV module and a mated frame, the roof system comprising:
   a grid-like structure of interconnected beams and mounting rails sitting on vertical elevation structures and defining a grid of roof members wherein the mounting rails are adapted as roofing members each having a base configured to support a plurality of stacked layers, a first channel on a first upper side of each of the mounting rails and a second channel on an opposing second upper side of each of the mounting rails, respectively; and
   a plurality of vertically stacked bracket assemblies, wherein each of the bracket assemblies is received by the first channel and the second channel of each of the mounting rails, respectively, and wherein each of the bracket assemblies respectively engages one of the photovoltaic modules at an external location exposed to an outside environment and that secures a plurality of stacked layers on at least one of the bracket assemblies below the photovoltaic module, the stacked layers comprising one or more structural or functional layers extending into an interior building environment, and wherein the photovoltaic modules are separated from the layers by a gap that is sized and arranged to provide passive or active cooling,
   wherein each of the a plurality of adjacent photovoltaic bracket assemblies define a roof surface; and
   the bracket assemblies being secured into each of the mounting rails with an overlying retaining fixture having a fastener extending downwardly into a respective one of the mounting rails.

11. The roof system as set forth in claim 10 wherein the stacked layers include insulating and supporting layers.

12. The roof system as set forth in claim 10 wherein the retaining fixture and a respective one of the mounting rails are secured together by a bolt.

13. The roof system as set forth in claim 10 wherein the photovoltaic modules are adapted from commercially available photovoltaic panels.

14. The roof system as set forth in claim 10 wherein the vertical elevation structure is supported by at least one of a wall and a column.

15. The roof system as set forth in claim 10 wherein the structural and functional layers include insulating and supporting layers.

16. The roof system as set forth in claim 15 wherein the roof members of the grid-like structure are arranged in parallel to slidably receive, capture and retain the photovoltaic modules between respective pairs of the members.

17. The roof system as set forth in claim 10 wherein the roof members of the grid-like structure are arranged in parallel to slidably receive, capture and retain the mated frames between respective pairs of the members.

18. The roof system as set forth in claim 10 wherein the brackets include hinges.

* * * * *